UNITED STATES PATENT OFFICE.

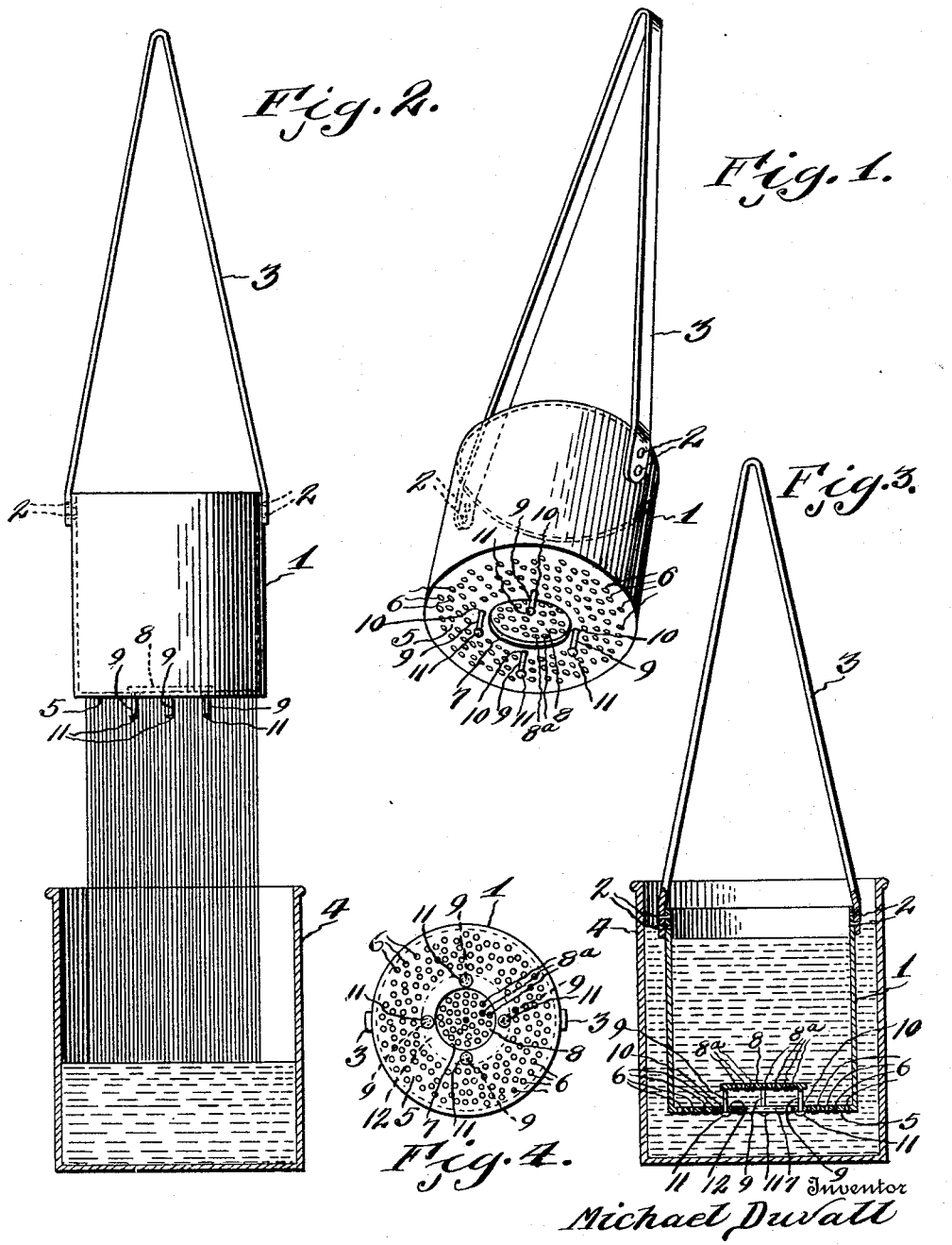

MICHAEL DUVALL, OF MARSHFIELD, WISCONSIN.

MILK-AERATOR.

1,213,342.

Specification of Letters Patent.  Patented Jan. 23, 1917.

Application filed July 24, 1916.  Serial No. 110,976.

*To all whom it may concern:*

Be it known that I, MICHAEL DUVALL, a citizen of the United States, residing at Marshfield, in the county of Wood and State of Wisconsin, have invented certain new and useful Improvements in Milk-Aerators, of which the following is a specification.

The invention relates to the art of aerating, ventilating and cooling milk.

The invention has for its object to facilitate the aeration of milk by subjecting the same to contact with the atmosphere, to thoroughly cool and deodorize it previous to shipment to factories, milk stations and the like, and also to prevent the milk from fermenting or souring in transit or from standing in container for a considerable time.

A further object is to provide an aerator vessel, having a perforated bottom with a central port normally engaged by a perforated valve, but so constructed that when the aerator is plunged into a container having milk therein, the perforated valve will be forced upwardly by contact with the milk. But upon withdrawal of the aerator-vessel, the perforated valve will be seated, by the force of the milk upon the upper surface of said valve, thereby allowing the milk in the aerator-vessel to percolate through the perforations in the bottom of the vessel and the valve allowing the milk to be exposed in thin streams to the chemical action of the atmosphere, at the same time the milk container may be immersed in cold water, or exposed to ice or cold air.

Another object is to provide means whereby the perforated disk valve will be guided and limited in its upward and downward movements in relations to the port in the perforated bottom of the aerator-vessel.

Other objects will appear and be better understood from the embodiment of the invention of which the following is a specification, reference being had to the accompanying drawings forming part thereof, in which:—

Figure 1, is a perspective view of the aerator-vessel. Fig. 2, is a side elevation of the device showing the same above a milk container and in operation. Fig. 3 is a vertical sectional view through the aerator-vessel and milk container, showing the disk valve in open position. Fig. 4 is a bottom plan view of the aerator-vessel.

Referring to the drawings: 1 designates a body member or container for the reception of milk and secured at 2, to the upper end thereof is a handle 3, adapted to be grasped in the hands when the aerator is plunged into a receptacle 4 containing milk. The bottom 5 of the container is provided with a series of small perforations 6, so that the milk in said container will percolate through the same and back into the receptacle in the form of a spray. The bottom of the container is also provided with a centrally located port 7 and normally closing said port is a disk valve 8, this valve is also provided with fine perforations 8ª. The disk valve 8 upon its under surface is provided with depending guide lugs 9, which are loosely mounted in the apertures 10 at diametrically opposite sides of the port 7. The lower ends of the lugs 9 are upset after they are placed in the apertures 10, so as to form the enlargements 11, which form means for limiting the upward movement of the disk valve and prevents displacement of the same.

It will be seen that when the handle 3 is grasped in the hands and the aerator-vessel is plunged downwardly into the milk in the receptacle 4, that the disk valve 8 will be forced upwardly by the resistance of the milk upon the under side of said disk valve. This downward movement will force the disk valve out of engagement with its seat 12 thereby allowing free ingress for the milk and therefore rapid filling of the container 1. This upward movement of the disk valve is limited by the enlargements 11 on the depending lugs. When the aerator-vessel is withdrawn from the receptacle 4, the disk valve is immediately forced downwardly by the resistance of the milk and guided into engagement with its seat 12 by means of the lugs 9. The aerator-vessel in its filled condition is then held above the receptacle and the milk allowed to spray downwardly through the perforations in the bottom of the container 1 and disk valve. This spraying through the atmosphere will cool, deodorize and expose the milk to the action of the atmosphere, thereby preventing rapid fermentation or souring of the milk in transit. These operations of plunging and spraying are continued until the desired amount of animal heat has been expelled from the milk.

Having thus described my invention what I claim and desire to secure by Letters Patent is:—

An aerator-vessel comprising a pail having a perforated bottom provided with a centrally located port, a perforated valve of greater diameter than said port and having integral depending lugs with enlargements on their lower ends, said depending lugs being slidably mounted in apertures in the bottom of the pail and forming means for guiding and limiting the upward and downward movement of the perforated valve so that said valve will seat upon the interior surface of the bottom of said pail when the aerator-vessel is lifted from the body of the liquid and a handle member attached to the upper end of said pail so that the aerator-vessel may be plunged into the liquid.

In testimony whereof I affix my signature in the presence of two witnesses.

MICHAEL DUVALL.

Witnesses:
FANNY E. COLE,
JOHN F. COLE.